(12) United States Patent
Coppens

(10) Patent No.: US 8,334,477 B1
(45) Date of Patent: Dec. 18, 2012

(54) METHOD AND APPARATUS FOR LASER WELDING ELONGATED WORKPIECES

(75) Inventor: Jackie Coppens, Lichtervelde (BE)

(73) Assignee: Roll Forming Corporation, Shelbyville, KY (US)

( * ) Notice: Subject to any disclaimer, the term of this patent is extended or adjusted under 35 U.S.C. 154(b) by 910 days.

(21) Appl. No.: 12/220,207

(22) Filed: Jul. 21, 2008

(51) Int. Cl.
B23K 26/24 (2006.01)

(52) U.S. Cl. ............... 219/121.63; 219/121.64

(58) Field of Classification Search ............ 219/121.63, 219/121.64, 102, 103, 126, 79, 81, 82, 121.13, 219/121.14, 121.83
See application file for complete search history.

(56) References Cited

U.S. PATENT DOCUMENTS

| | | | |
|---|---|---|---|
| 3,648,009 A * | 3/1972 | Steigerwald | 219/121.14 |
| 4,654,505 A | 3/1987 | Sciaky et al. | |
| 4,700,045 A * | 10/1987 | Merry et al. | 219/121.83 |
| 4,855,565 A * | 8/1989 | Thomas et al. | 219/121.79 |
| 5,731,566 A | 3/1998 | Steinhart | |
| 5,841,098 A * | 11/1998 | Gedrat et al. | 219/121.63 |
| 5,925,268 A * | 7/1999 | Britnell | 219/121.63 |
| 5,994,666 A | 11/1999 | Buldhaupt et al. | |
| 6,351,882 B1 | 3/2002 | Waymer et al. | |
| 6,441,338 B1 | 8/2002 | Rabinovich | |
| 6,545,246 B2 | 4/2003 | Kummle | |
| 6,633,018 B2 * | 10/2003 | Shikoda et al. | 219/121.63 |
| 7,057,131 B2 | 6/2006 | Kruckels | |
| 2002/0104833 A1 * | 8/2002 | Bradley | 219/121.63 |
| 2003/0230555 A1 * | 12/2003 | Kummle | 219/121.63 |
| 2004/0069755 A1 | 4/2004 | Eftymiades | |
| 2004/0084424 A1 * | 5/2004 | Kruckels | 219/121.63 |
| 2004/0194275 A1 | 10/2004 | Kummle | |
| 2006/0065643 A1 | 3/2006 | Hackius et al. | |
| 2006/0096957 A1 | 5/2006 | Pfiz | |
| 2007/0090097 A1 | 4/2007 | Chen | |

FOREIGN PATENT DOCUMENTS

| | | | |
|---|---|---|---|
| DE | 4412093 A | * | 10/1995 |
| EP | 0333966 | | 9/1989 |
| JP | 60106687 | | 6/1985 |
| JP | 61222694 | | 10/1986 |
| JP | 63-154283 A | * | 6/1988 |
| JP | 6106373 | | 4/1994 |
| JP | 8-90264 A | * | 4/1996 |
| JP | 2002-86286 A | * | 3/2002 |

OTHER PUBLICATIONS

Machine translation of Japan Patent No. 8-90,264, Oct. 2011.*

* cited by examiner

Primary Examiner — Geoffrey S Evans
(74) Attorney, Agent, or Firm — Roger S. Dybvig

(57) ABSTRACT

Weld seams that vary in height along the lengths of a pair of workpieces are produced using at least one laser weld head mounted for vertical and rotary movements to accommodate differences in the vertical heights and contours of seam lines along which the weld seams are to be formed.

3 Claims, 12 Drawing Sheets

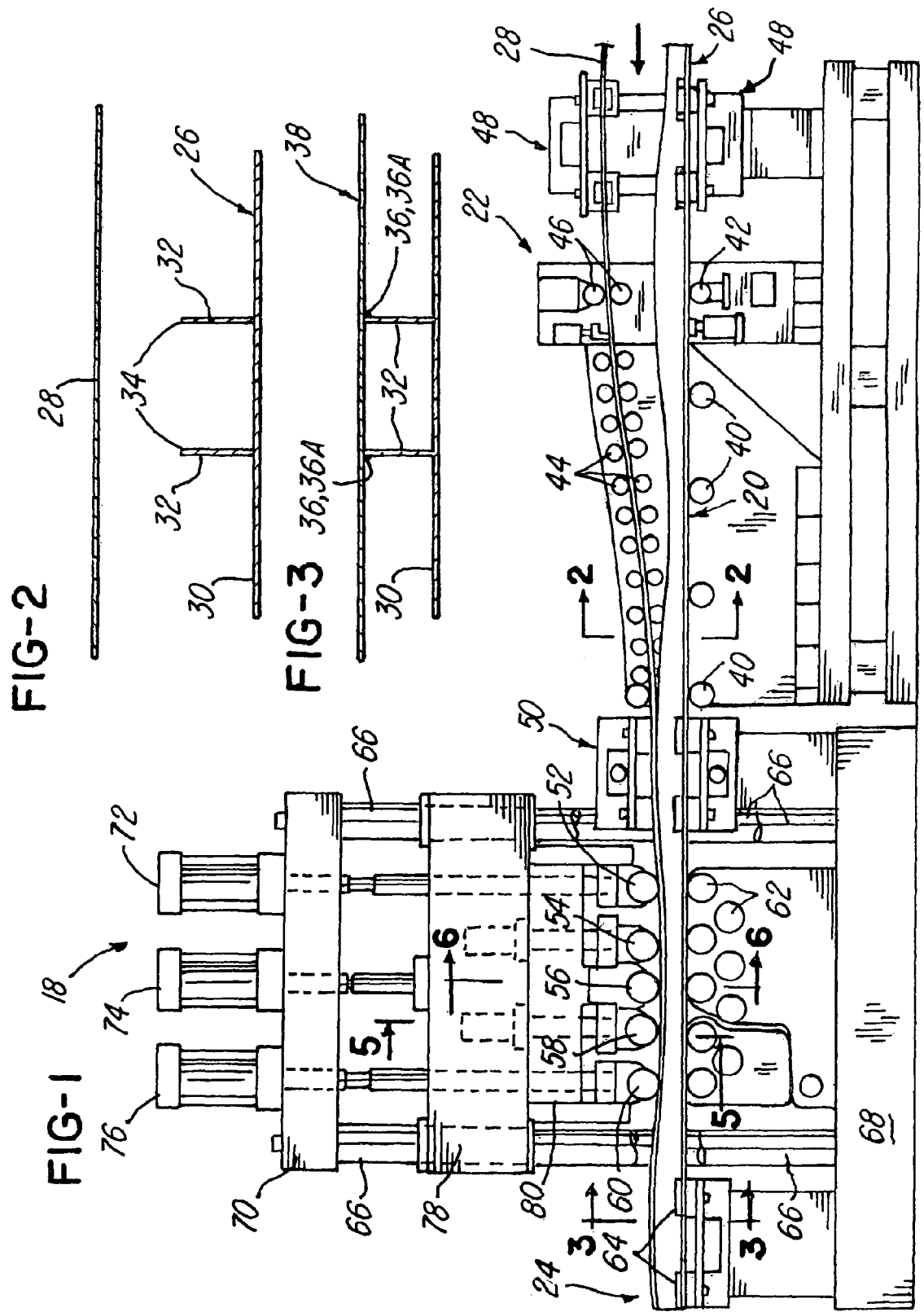

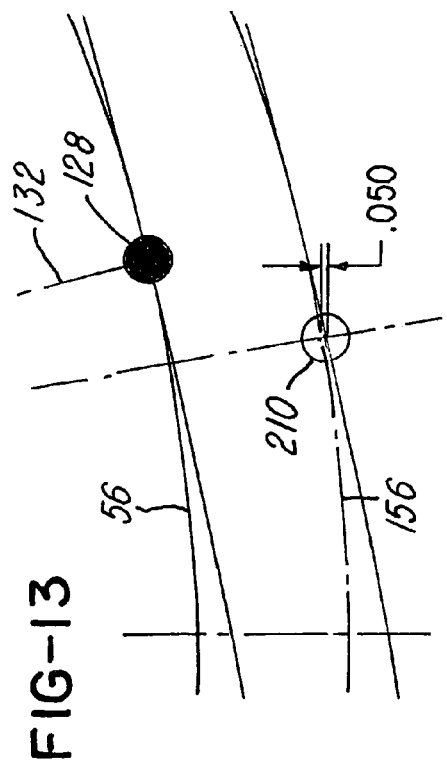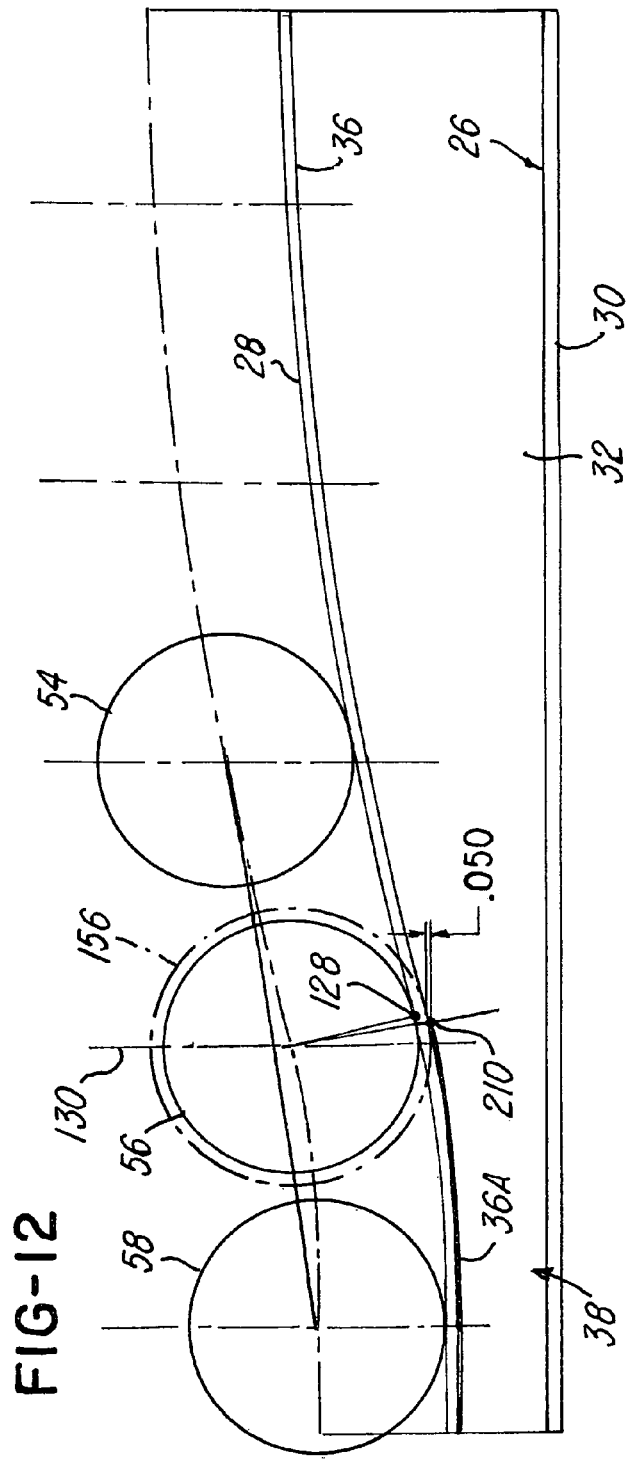

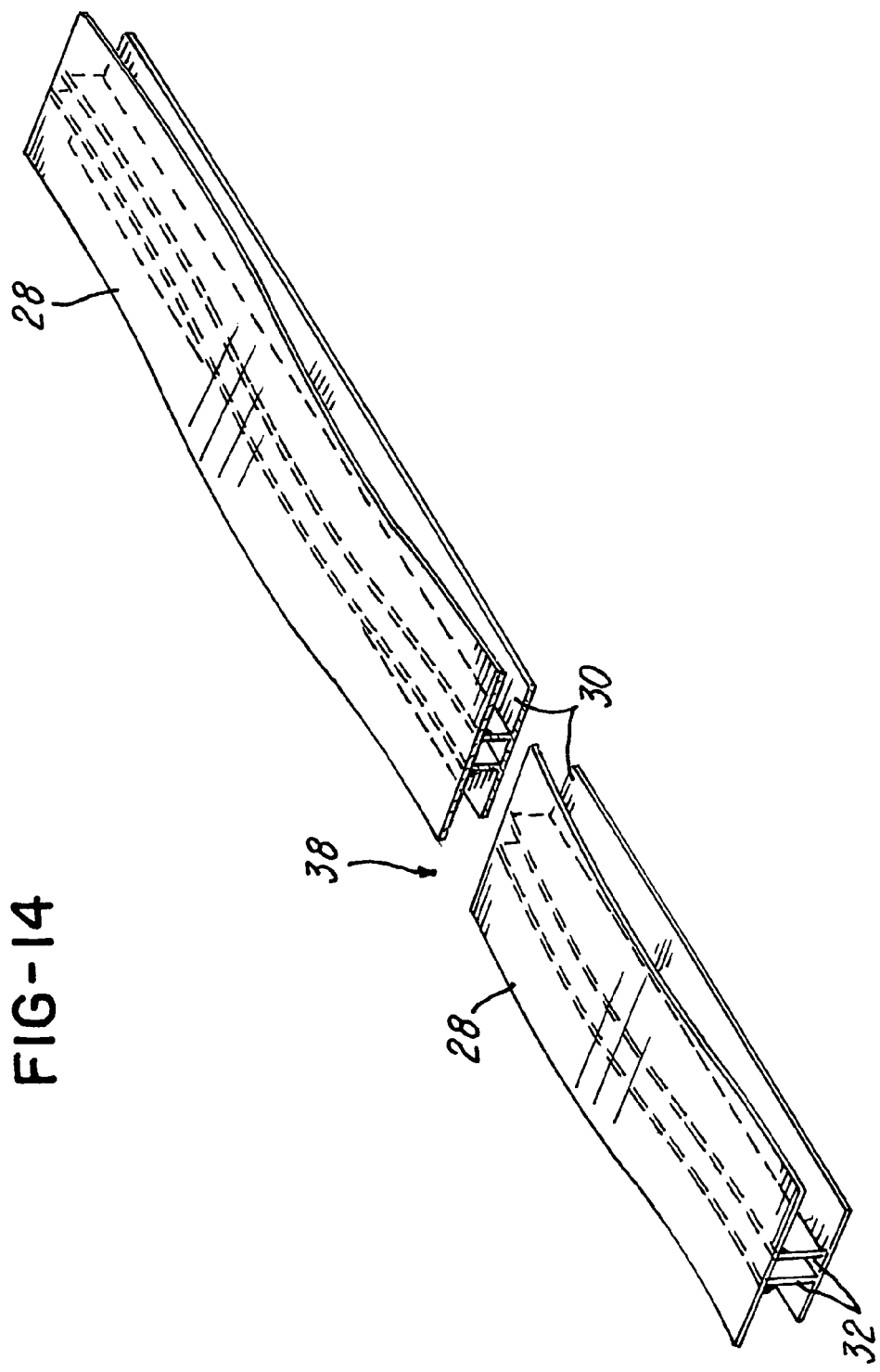

US 8,334,477 B1

METHOD AND APPARATUS FOR LASER WELDING ELONGATED WORKPIECES

FIELD OF THE INVENTION

This invention relates to a welding machine and method particularly for continuously welding elongate workpieces along a continuous seam extending lengthwise of the workpieces to be welded.

INCORPORATION BY REFERENCE

The entire disclosure of Published Patent Application No. US 2003/0230555 A1 of Kummle, published Dec. 18, 2003, is hereby incorporated by reference herein, and referred to herein as the "Kummle application." The entire disclosure of U.S. Pat. No. 6,545,246 B2, issued Apr. 8, 2003, is hereby incorporated by reference herein, and referred to herein as the "Kummle patent."

BACKGROUND OF THE INVENTION

The Kummle application discloses a welding machine used in conjunction with a production line that includes a roll forming machine. The Kummle application discloses a method wherein the heads of laser welders move vertically up and down for forming welded seams along vertically varying lines for workpieces which have heights which vary along their lengths. However, vertical movements of the laser welders may not be sufficient to produce satisfactory welds because the points of maximal engagement of two parts being welded are not always in the vertical plane along which the laser welders move.

The Kummle patent discloses a welding device in line with a roll forming machine. The welding device includes a single energy source connected with at least two welding heads for simultaneously producing two weld joints on a pair of roll-formed workpieces.

SUMMARY OF THE INVENTION

This invention improves upon the formation of a welded seam on a welded profile which varies in height and slope along the length of the workpieces from which the profile is made. To this end, a laser weld head is mounted for rotary movements as well as vertical movements to enhance the welded connections between the workpieces being welded.

As will be apparent, a pair of welded seams could be produced simultaneously on opposite sides of the workpieces.

Features and advantages of this invention will become apparent from the following description and claims and from the accompanying drawings.

BRIEF DESCRIPTION OF THE DRAWINGS

FIG. 1 is a front elevational view of a welding machine in accordance with this invention, a workpiece feed assembly, and a workpiece moving through the welding machine and the feed assembly.

FIG. 2 is an enlarged cross-sectional view taken on line 2-2 of FIG. 1 showing two workpiece parts which are welded together in the weld machine to form a completed workpiece.

FIG. 3 is an enlarged cross-sectional view taken on lone 3-3 of FIG. 1 showing the two parts of the workpiece after being welded together.

FIG. 4 additionally shows a workpiece passing through the hold-down roll and squeeze roll assembly.

FIG. 4B also includes a plan view of the seam tracking assembly of this invention.

FIG. 8 also shows an upstream hold-down roll subassembly to the right of the hold-down roll assembly and squeeze roll assembly and a downstream pre-tension roll subassembly to the left of the hold-down roll assembly and squeeze roll assembly as viewed in FIG. 8. The location of the weld point is diagrammatically indicated in FIG. 8.

FIG. 12 is a diagrammatic view similar to FIG. 11 indicating a condition in which the weld point is slightly spaced from the optimum weld point.

FIG. 13 is a further simplified, diagrammatic view on a much larger scale than FIG. 12 and indicating the same condition illustrated in FIG. 12.

FIG. 14 is a fragmentary isometric view, partly in cross section, on a scale smaller than FIG. 3, of the completed workpiece.

DETAILED DESCRIPTION

Figure 4A:
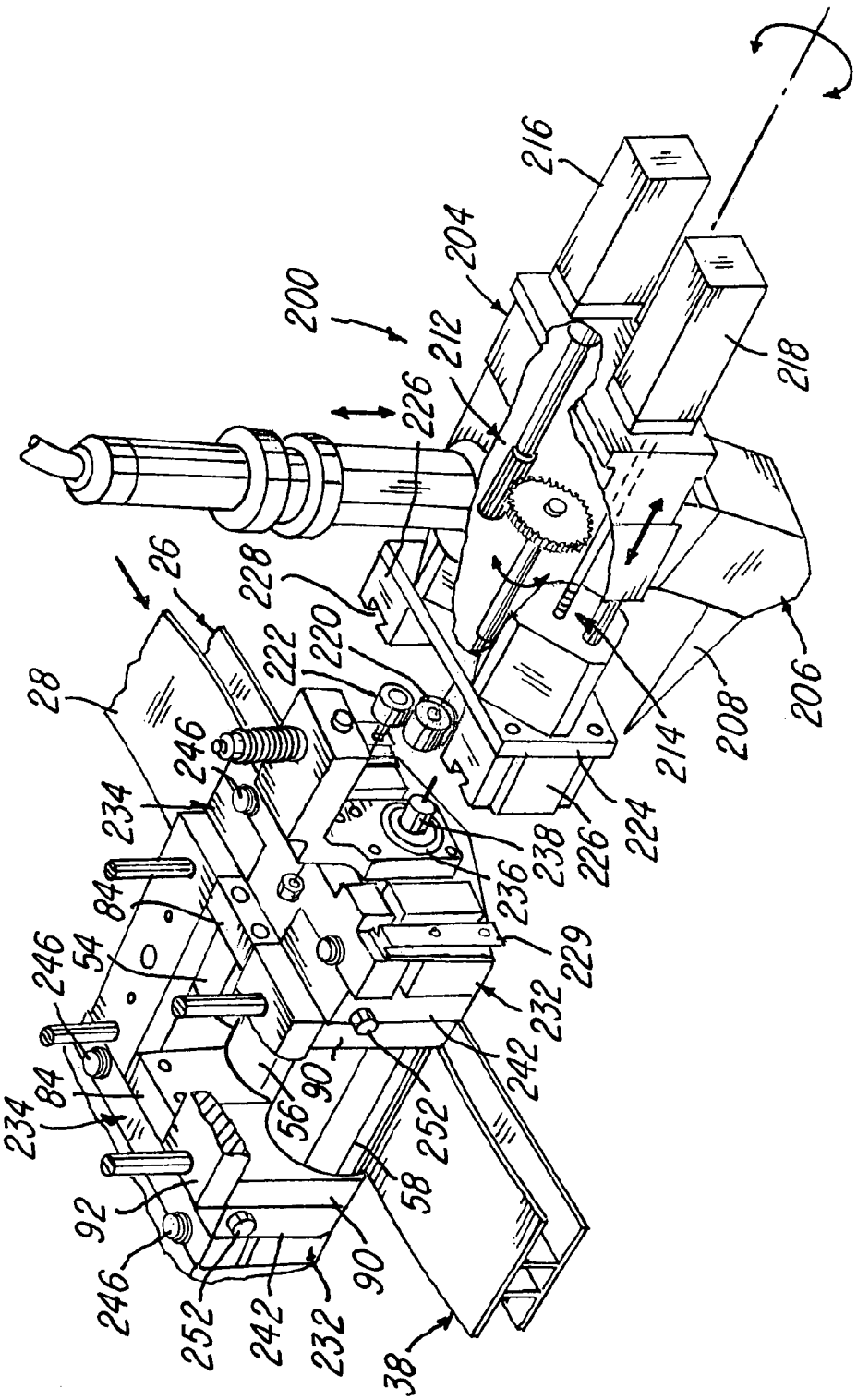
FIG. 4A is a fragmentary isometric view, with parts broken away and parts in cross section, of a laser welder support assembly and a laser welder supported thereby and also showing parts of a hold-down roll and squeeze roll assembly.
Figure 4B:
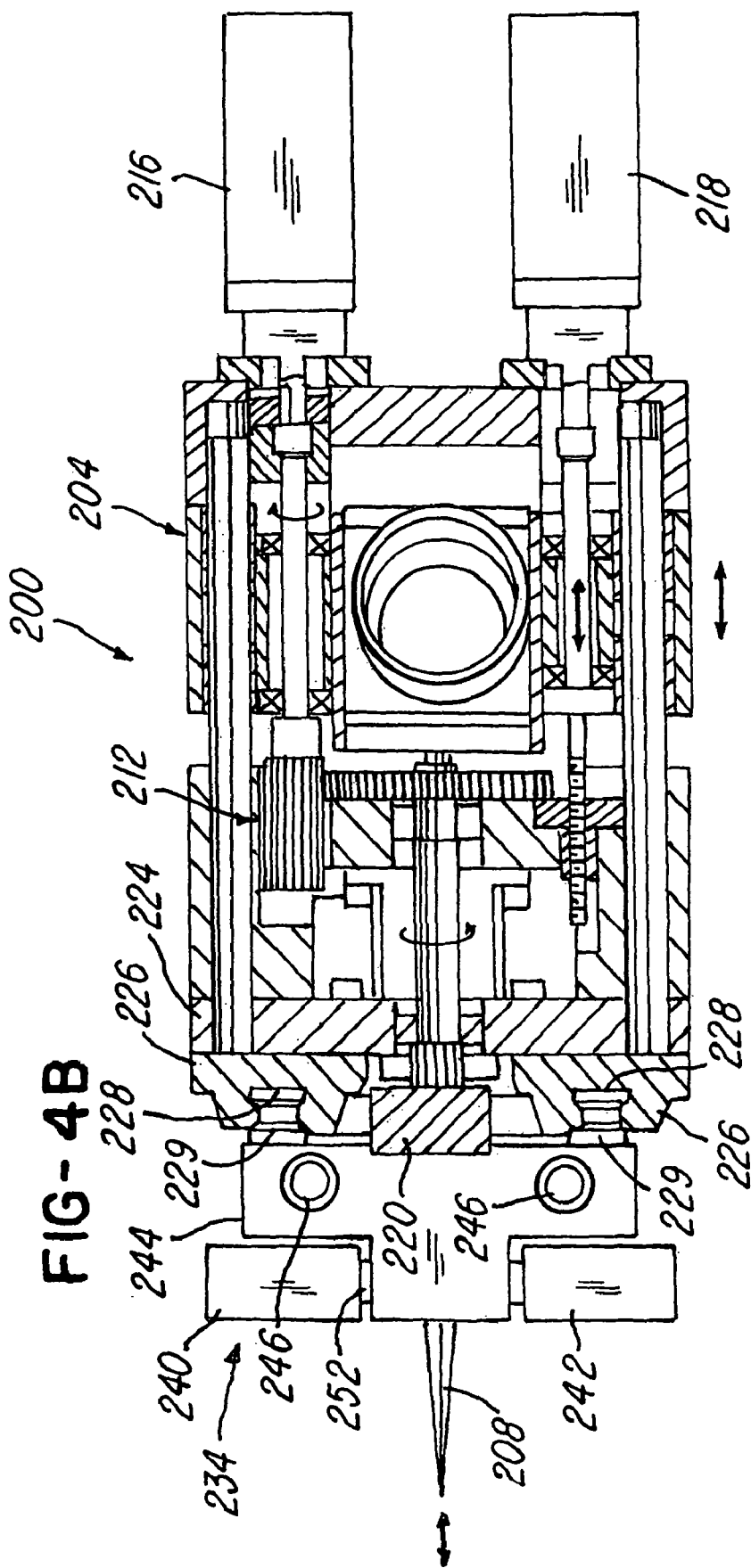
FIG. 4B is a top plan view of the laser welder support assembly and a laser welder supported thereby with parts broken away and parts shown in cross section.

A welding machine 18 in accordance with this invention is illustrated in FIG. 1 as located along a track 20 between an upstream workpiece feed station 22 and a downstream welded profile exit station 24. With reference also to FIGS. 2, 3 and 14, the workpieces fed to the welding machine 18 comprise an elongate metal profile base member 26 and an elongate metal strip 28. The profile base member 26 may be referred to as an inverted π-shaped member having a strip-like base plate 30 and a pair of upstanding support rails 32 which have top edges 34. The illustrated profile base member 26 may be extruded from a metal blank (not shown) but this invention could be used with profile members (not shown) having various different shapes and manufactured by roll-forming or other methods of manufacture. The method of this invention could be used to manufacture elongate parts for use in aircraft. For example, the profile base member 26 could be as long as 40 feet or even longer. Typically, the metal strip 28 would be cut to the same length as the profile base member 26.

The placement of the metal strip 28 on the profile base member 26 creates a pair of seams 36 between the bottom surface of the metal strip 28 and the top edges 34 of the support rails 32. As diagrammatically illustrated in FIG. 3, the metal strip 28 and the profile base member 26 are welded together along the seams 36 to form a welded seam 36A. (FIG. 3 diagrammatically represents welds alongside the welded seams 36A but in reality the welded seams 36A are created by the melting and bonding together under heat and pressure of the metal material from which the metal strip 28 and the profile base member 26 are formed.) The completed welded profile is identified by reference number 38 herein.

It will be noted that the top edges 34 of the support rails 32 are not uniformly spaced from the bottom surface of the profile base plate 30. Rather, the top edges 34 of the support rails 32 are sinuous along their lengths. Therefore, the seams 36 along which the metal strip 28 is welded to the support rails 32 progresses in a wavy pattern from one end of the profile base member 26 to the other as will be further described below.

Referring again to FIG. 1, the upstream workpiece feed station 22 can be of conventional construction and may comprise plural support rolls 40 and feed rolls 42 for the profile base member 26, guide rolls 44 and feed roles 46 for the metal strip 28 and conventional guide systems 48 and 50 for both the profile base member 26 and the metal strip 28. As the profile base member 26 and the metal strip 28 enter the welding machine 18, the metal strip 28 is effectively clamped to the top edges 34 of the rails 32 of the profile base member 26.

With reference to FIGS. 1 and 8-10, the illustrated welding machine 18 includes an array of five side-by-side pressure rolls, namely a first upstream hold-down roll 52, a second upstream hold-down roll 54, a center pinch roll 56, a first downstream hold-down roll 58 and a further downstream pre-tension roll 60. These all apply a downward pressure exerted on top of the metal strip 28 while the profile base member 26 is supported from below by an array of support and drive rolls 62. The rolls 52, 54, 56, 58 and 60 are rotatably mounted for rotation about their respective horizontal axes.

As is believed evident, the first and second upstream hold-down rolls 52 and 54 firmly clamp the metal strip 28 to the top of the profile bass member rails 32. As will be described in greater detail below, the welding of the metal strip 28 to the profile base member 26 occurs close to the bottom of the center pinch roll 56. The first and second downstream rolls 58 and 60 continue to apply pressure to the metal strip 28 to ensure that the welded seam 36A remains secure as the completed welded profile 38 continues to move downstream from the center pinch roll 56. The second downstream roll 60 is also provided to pre-tension the completed welded profile 38 to overcome the natural tendency of the metal strip 28 to curve upwardly due to the heating of the completed welded profile 38 caused by the welding process as the completed welded profile 38 moves downstream from the center pinch roll 56. Progressing downstream from the welding station 18, the completed welded profile 38 is guided by guide rolls 64 along the exit station 24 for further processing or removal from the exit station 24. As those familiar with the art are aware, the completed welded profile 38 would usually undergo further processing to achieve its desired final configuration.

Figure 5:
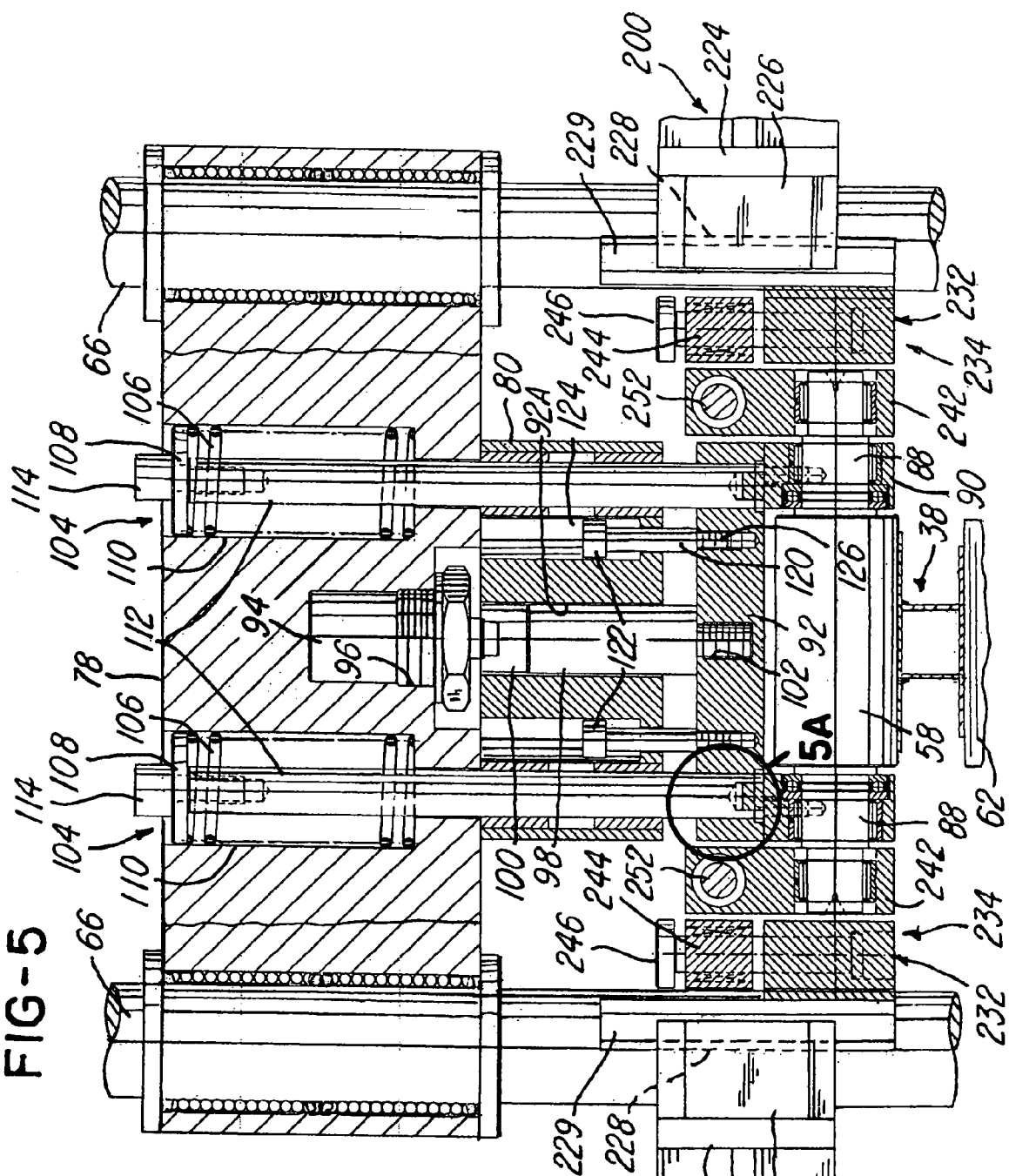
FIG. 5 is an enlarged fragmentary cross sectional view of the workpiece and a hold-down roll subassembly taken on line 5-5 of FIG. 1.
Figure 6:
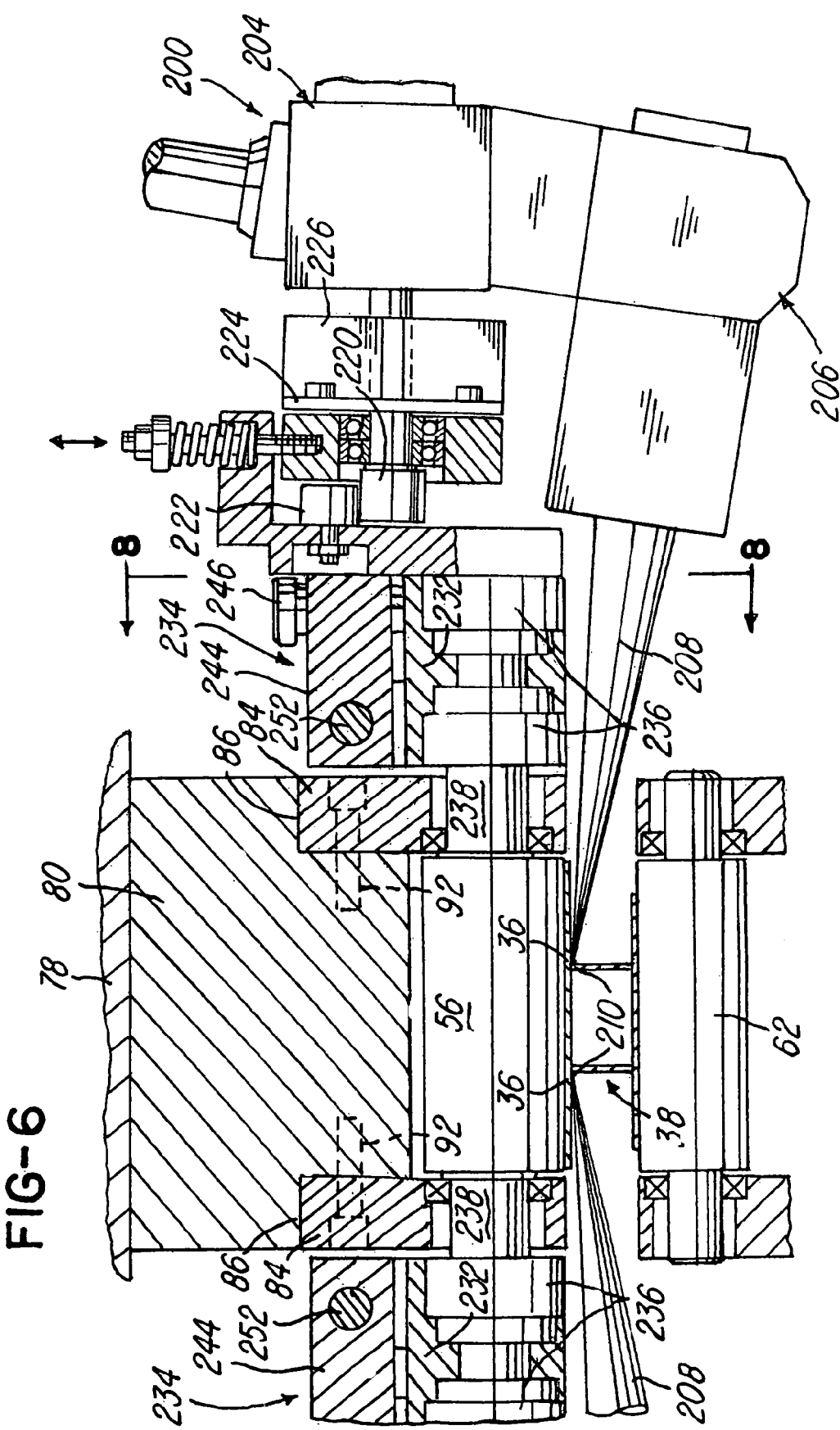
FIG. 6 is an enlarged fragmentary cross sectional view of the workpiece and a squeeze roll subassembly taken on line 6-6 of FIG. 1.
Figure 7:
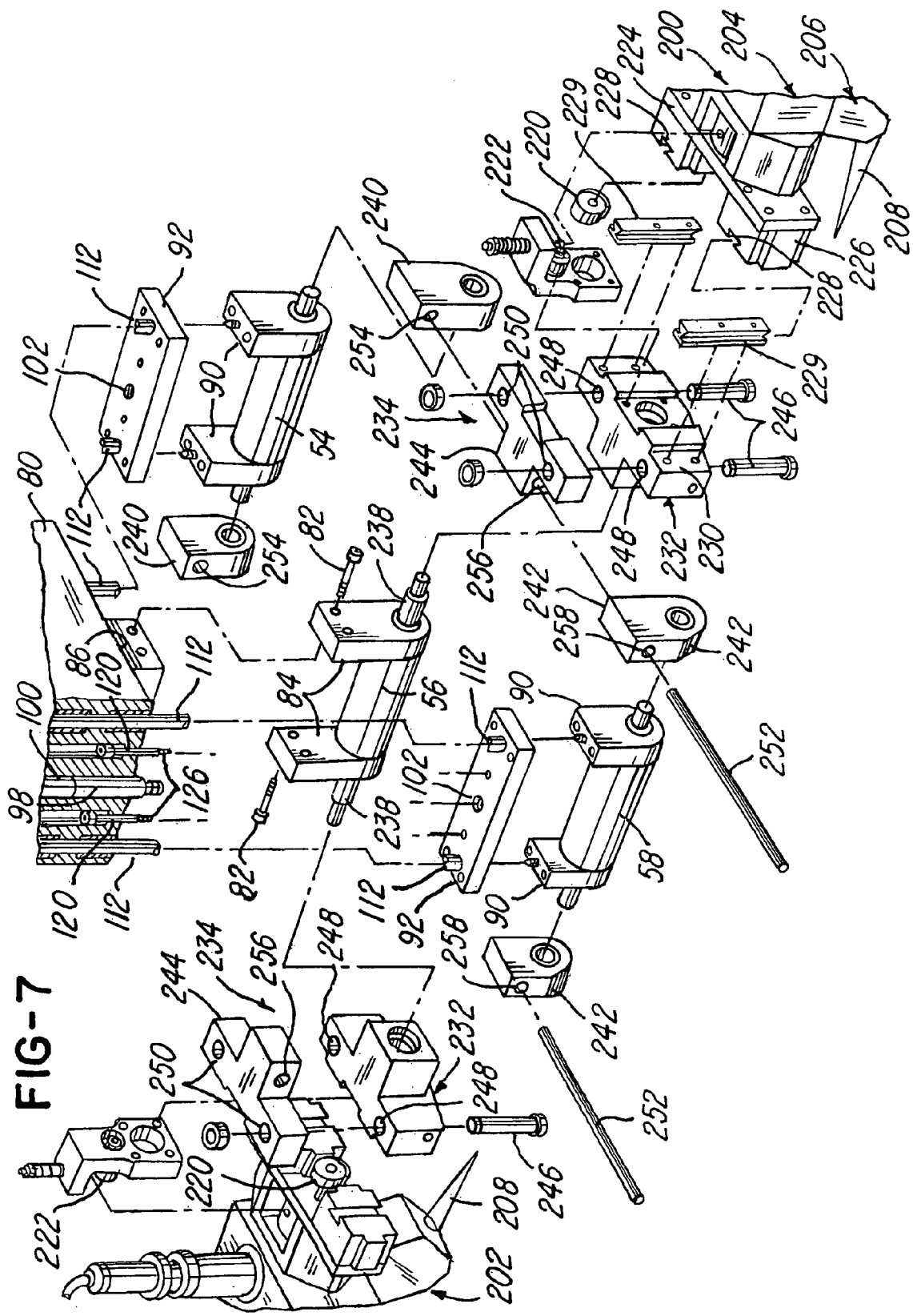
FIG. 7 is a simplified, exploded isometric view of the hold-down roll and squeeze roll assembly, a fragment of the welder and the welder support assembly, and the seam tracking assembly on both the front and back of the track along which the profile moves through the welding machine.

With reference again to FIG. 1 and also to FIGS. 5-7, the welding machine 18 has a set of four, vertically extending, guide and support posts 66 mounted on the machine bed 68 that support a cylinder support plate 70 above the welding machine rolls 52, 54, 56, 59 and 60. Mounted on the cylinder support plate 70 are three hydraulic pressure-applying cylinders, namely an upstream hold-down cylinder 72, a middle, pinch roll pressure cylinder 74 and a downstream pre-tension cylinder 76.

The guide and support posts 66 also guide a ram 78 for vertical movement beneath the cylinder support plate 70. With reference to FIGS. 6 and 7, fixed in any suitable fashion to the bottom of the ram 78 is a pinch roll pressure plate 80 connected, as illustrated in FIGS. 6 and 7, by screws 82 to pinch roll bearing housings 84 at opposite ends of the pinch roll 56. The top surfaces of the bearing housings 84 engage flush against shoulders 86 formed at both sides of the pinch roll pressure plate 80. As apparent, pinch roll cylinder 74 acting through the ram 78, pinch roll pressure plate 80 and the pinch roll bearing housings 84 can be energized to directly apply pressure to the pinch roll 56. By virtue of this construction an appropriate pinch roll pressure can be maintained throughout the passage of the profile base member 26 and the metal strip 28 under the pinch roll 56 to ensure that the seam 36 is under uniform pressure during the welding operation.

Referring now to FIGS. 5 and 7, the hold-down roll 58 immediately downstream from the pinch roll 56 is supported at its ends by bearings 88 mounted in bearing housings 90 depending from and fixed to a roll support plate 92 by screws (not shown). A hydraulic, downstream hold-down roll actuator 94 threadedly mounted in bore 96 in the ram 78 applies a downward force against a force transmitting shaft 98 slidably received within a through bore 92A in the pinch roll pressure plate 80 aligned with the piston rod 100 of the hydraulic downstream hold-down roll actuator 94. Downward pressure is applied to the welded profile 38 by the piston 100 of the hydraulic actuator 94 which bears downwardly against the top end of the force-transmitting shaft 98 when the hydraulic actuator 94 is energized. The force-transmitting shaft 98 is threadedly connected at its lower end 102 to the downstream roll support plate 92. There is no connection between the force-transmitting shaft 98 and the piston rod 100, thereby to enable the force-transmitting shaft 98 to slide within the central bore 92A as will be discussed below.

Figure 5A:
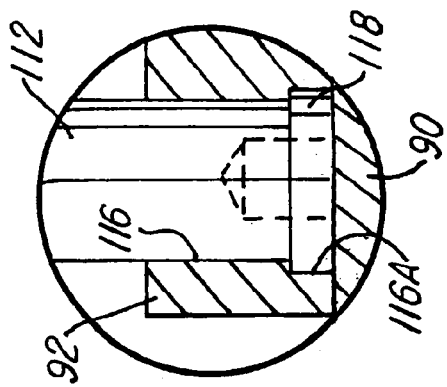
FIG. 5A is an enlarged cross-sectional view of a portion of the hold-down roll assembly within the circular section line 5A of FIG. 5.

With continued reference to FIGS. 5 and 7, a constant downward force is exerted on the downstream hold-down roll 58 by the hydraulic actuator 94 as the completed welded profile 38 passes through the welding machine 18. Thereafter, the hydraulic actuator 94 may be de-energized and the downstream hold-down roll 58 elevated by a pair of downstream hold-down roll lifting assemblies 104, each of which includes a compression spring 106 trapped beneath a spring cap 108 slidably received within a compression spring-receiving bore 110 in the ram 78. With reference also to FIG. 5A, each lifting assembly 104 further includes a lifting post 112 connected by a screw 114 at its upper end to the associated spring cap 108. Each lifting post 112 extends downwardly through a through bore 116 in the roll support plate 92. Flanges 118 encircling the lower ends of the lifting posts 112 are received within counterbores 116A at the bottom of the roll support plate 92. The compression springs 106 assert a significantly lower upward force on the roll support plate 92 than the downward force created by the hydraulic actuator 94 when the actuator 94 is energized. Therefore, the lifting assemblies 104 are only effective when the hydraulic actuator 94 is not energized.

As shown in FIG. 5, a pair of cylindrical connectors 120 having enlarged heads 122 slidable within bores 124 in the pinch roll pressure plate 80 and having threaded lower ends 126 threadedly connected to the roll support plate 92 are provided to prevent the accidental falling of the roll support plate 92 and the downstream hold-down roll 54 should, for example, the screws 114 at the top of the lifting posts 112 be removed for purposes of disassembly.

The housing 12 may be manufactured in a generally flat form illustrated in FIG. 6. After removed from the mold (not shown), the housing components 14 and 16 can be rotated around the hinge 18 to bring their confronting faces together toward one another around the hinge 18, whereupon the tongues 42 enter the grooves 36 and hold the two housing components 14 and 16 in their face-to-face relationship.

Here it may be noted that the upstream hold-down roll 54 is mounted in precisely the same manner as the downstream hold-down roll 58 just described and corresponding parts are identified by the same reference numbers. Therefore, the mounting of upstream hold-down roll 54 is not further described herein.

With reference to FIGS. 1, 4A, 4B, 6 and 7, the welded seams 36A which affix the metal strip 28 to the profile base member 26 are created will now be described. Two laser welding assemblies, a front assembly 200 and a rear assembly 202 are mounted adjacent the track 20 along which profile members 26 and 28 move in line with the pinch roll 56. The two laser welding assemblies 200 and 202 may be essentially identical and only the front laser welding assembly 200 is described in detail herein, with like parts of the two laser assemblies 200 and 202 illustrated in the drawings being identified by like reference numbers.

With reference to FIGS. 4A, 4B, 6 and 7, the laser welding assembly 200 includes a laser welding head 204 which includes laser optics 206 that produce a cone-shaped laser beam 208 focused at a focal point 210 on the seam 36 to be welded as it passes the outer margin of the pinch roll 56. The focal point 210 is also referred to herein as the "weld point 210" herein because the focal point 210 is also the point at which the seam 36 is welded. As best illustrated in FIG. 4A, fine adjustments of the location of the focal point 210 of the laser beam 208 may obtained by the use of adjusting mechanisms 212 and 214 with drive motors 216 and 218, respectively. The adjusting mechanism 212 and 214 may be entirely conventional and, although critical to precisely locating the focal point 210, are not part of the present invention and not further described herein.

A laser mounting plate 224 supports the laser welding assembly 200. Mounting plate 224 in turn is supported by a pair of support blocks 226 provided with dovetail slots 228 that are slidably mounted on a pair of generally vertical mounting tracks 229 affixed to the front face 230 of a rotatable support member 232 forming part of a seam tracking assembly 234 in accordance with this invention. The rotatable support member 232 is mounted by bearings 236 for rotation about the shaft 238 on which the pinch roll 56 is rotatably mounted so that the rotatable support member 232 is rotatable about the axis of the pinch roll 56. Due to the adjustably fixed connection between the rotatable support member 232 and the laser welding assembly 200, the laser welding assembly 200 will rotate in unison with the rotation of the rotatable support member 232 about the horizontal, longitudinal axis of the pinch roll 56.

The rotatable support member 232 is caused to rotate about the axis of the pinch roll shaft 238 vertical movements as best shown in FIG. 7, the seam tracking assembly 234 also includes a first, upstream bearing housing 240 rotatably mounted on the shaft of the upstream hold-down roll 54 immediately adjacent the pinch roll 56; a second, downstream bearing housing 242 rotatably mounted on the downstream hold-down roll 58 immediately adjacent the pinch roll 56; a motion transmitting plate 244 over the top of the rotatable support member 232 and guided for generally vertical movements relative to the rotatable support member 232 by a pair of guide posts 246 that extend through generally vertical, aligned through bores 248 and 250 in the rotatable support member 232 and the motion transmitting plate 244, respectively; and a generally horizontal connecting rod 252 that extends through aligned bores 254, 256, and 258 in first, upstream bearing housing 240, the motion transmitting plate 244, and the second, downstream bearing housing 242, respectively.

Figure 8:
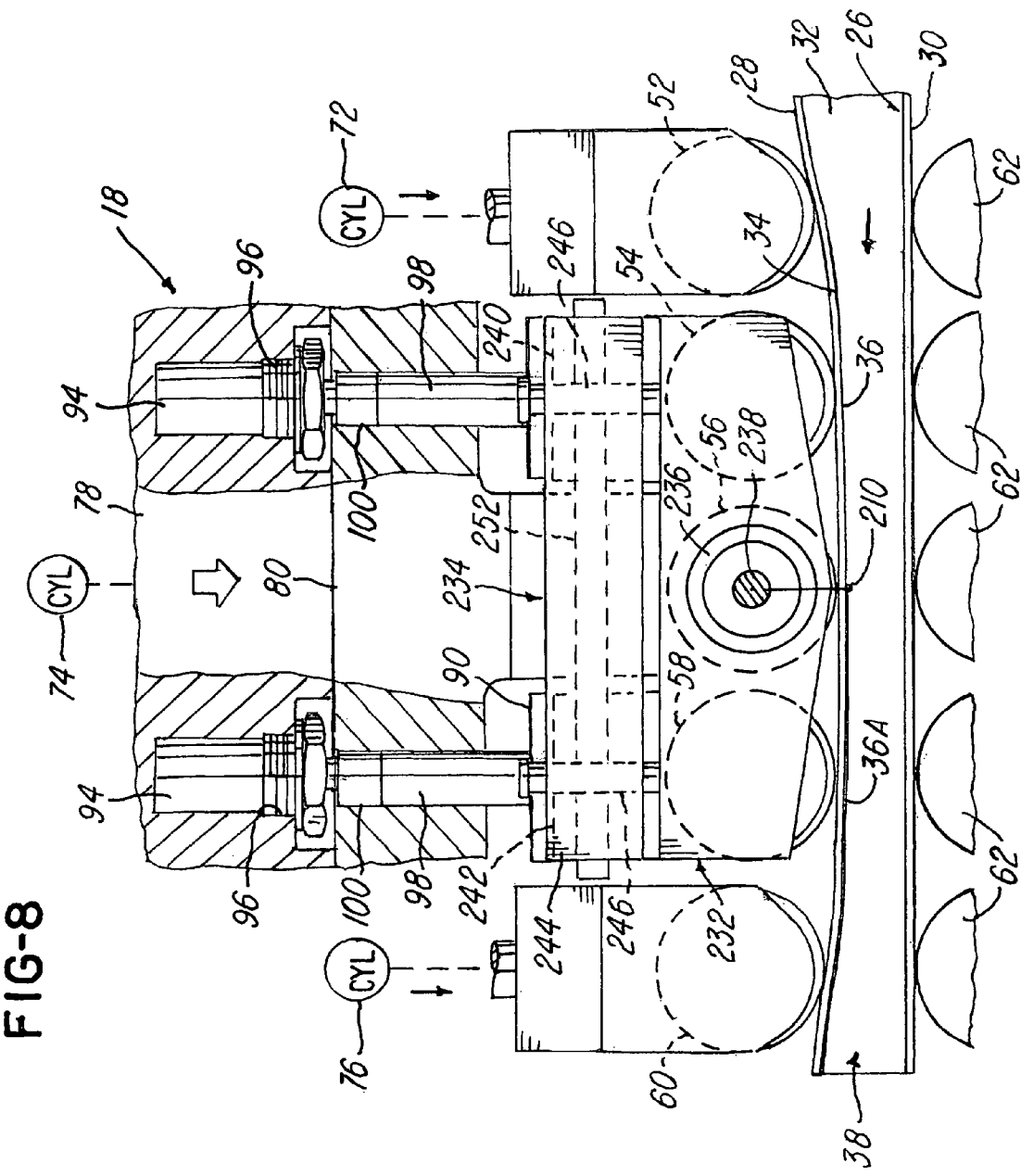
FIG. 8 is an enlarged, simplified, fragmentary view, with parts in cross section, taken on line 8-8 of FIG. 6 of the workpiece and the hold-down roll and squeeze roll assembly.
Figure 9:
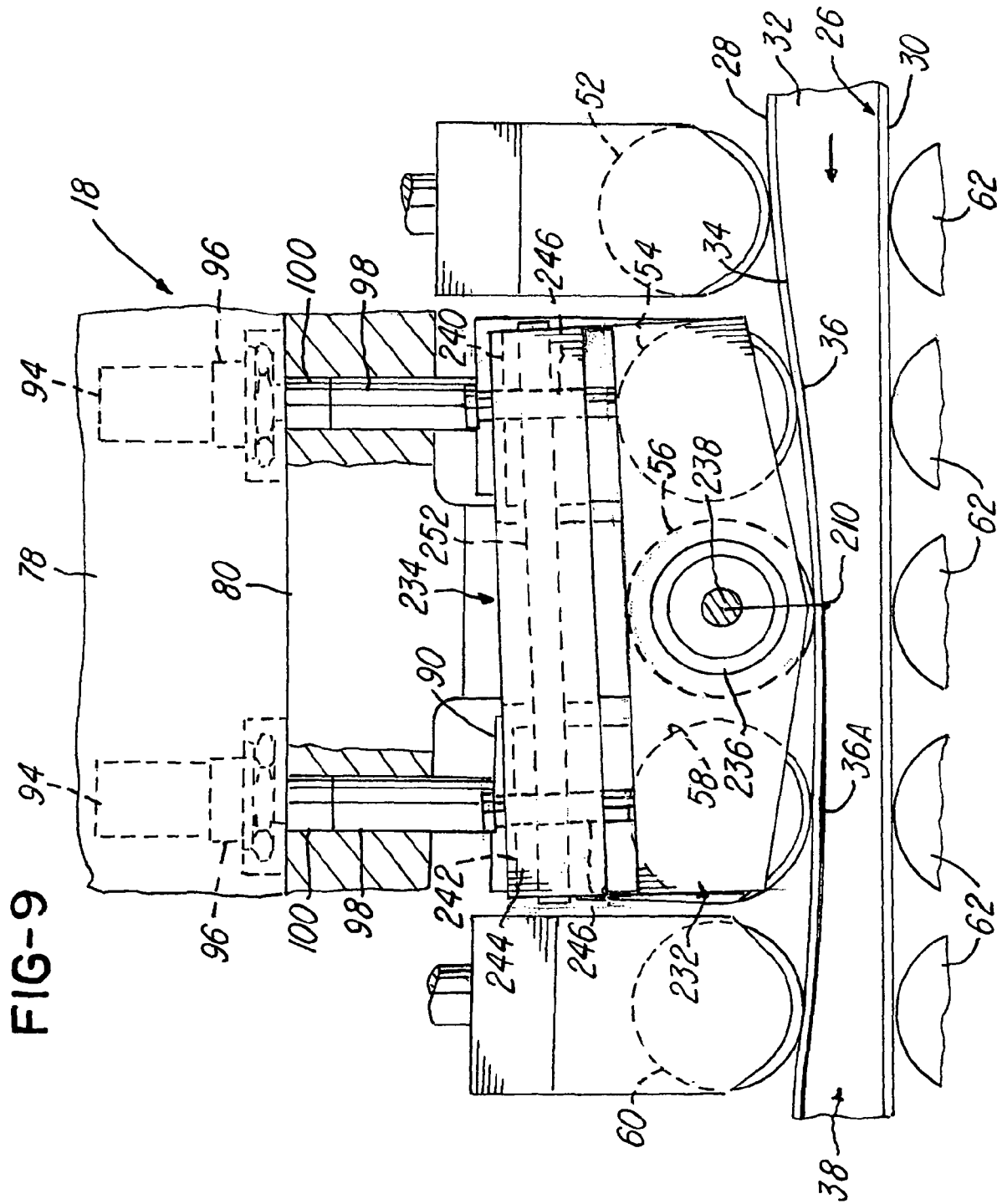
FIG. 9 is a view similar to FIG. 8 but showing a different portion of the workpiece engaged with the rolls.
Figure 10:
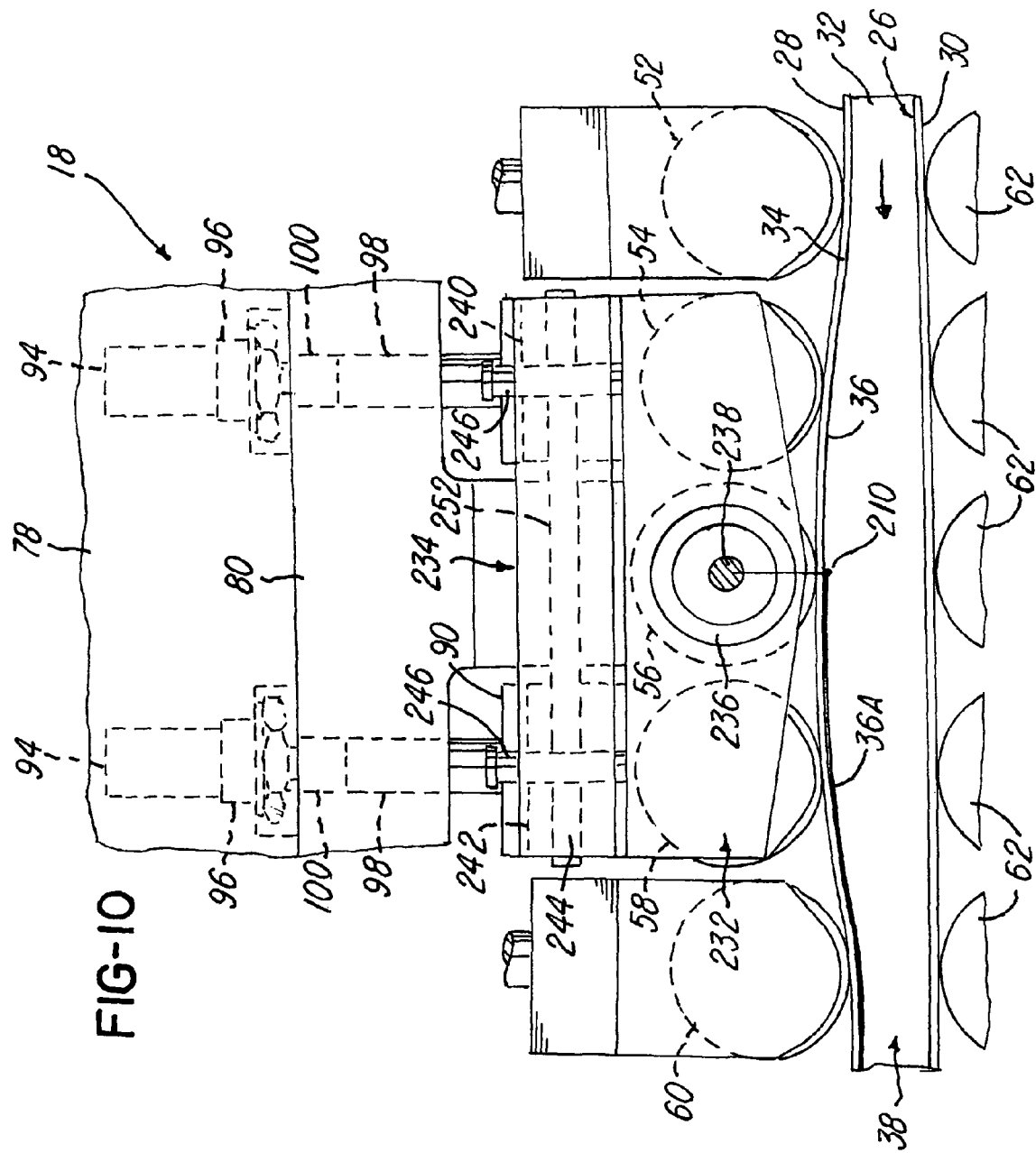
FIG. 10 is a view similar to FIGS. 8 and 9 but showing still different portions of the workpiece engaged with the rolls.

FIGS. 8, 9 and 10 illustrate the upstream hold-down roll 54, the pinch roll 56 and the downstream hold-down roll 58 engaged with different portions of the metal strip 28 as the metal strip passes beneath them. Due to the constructions described above, the three rolls 54, 56 and 58 are always engaged with the metal strip 28 while the metal strip 28 is being welded to the profile base member 26. At the position shown in FIG. 8, all three rolls 54, 56 and 58 are at the same height. In FIG. 9, the hold-down rolls 54 and 58 are elevated above the level of the pinch roll 56 due to the illustrated concave contour of the metal strip 28. FIG. 9 also illustrates a condition in which the upstream hold-down roll 54 is higher than the downstream hold-down roll 58 so that the rotatable support member slants from upper right to the left due to the operation of the seam tracking assembly 234. In FIG. 10, the hold-down rolls 54 and 58 are below the level of the pinch roll 56 due to the illustrated convex contour of the metal strip 28 at that point.

Figure 11:
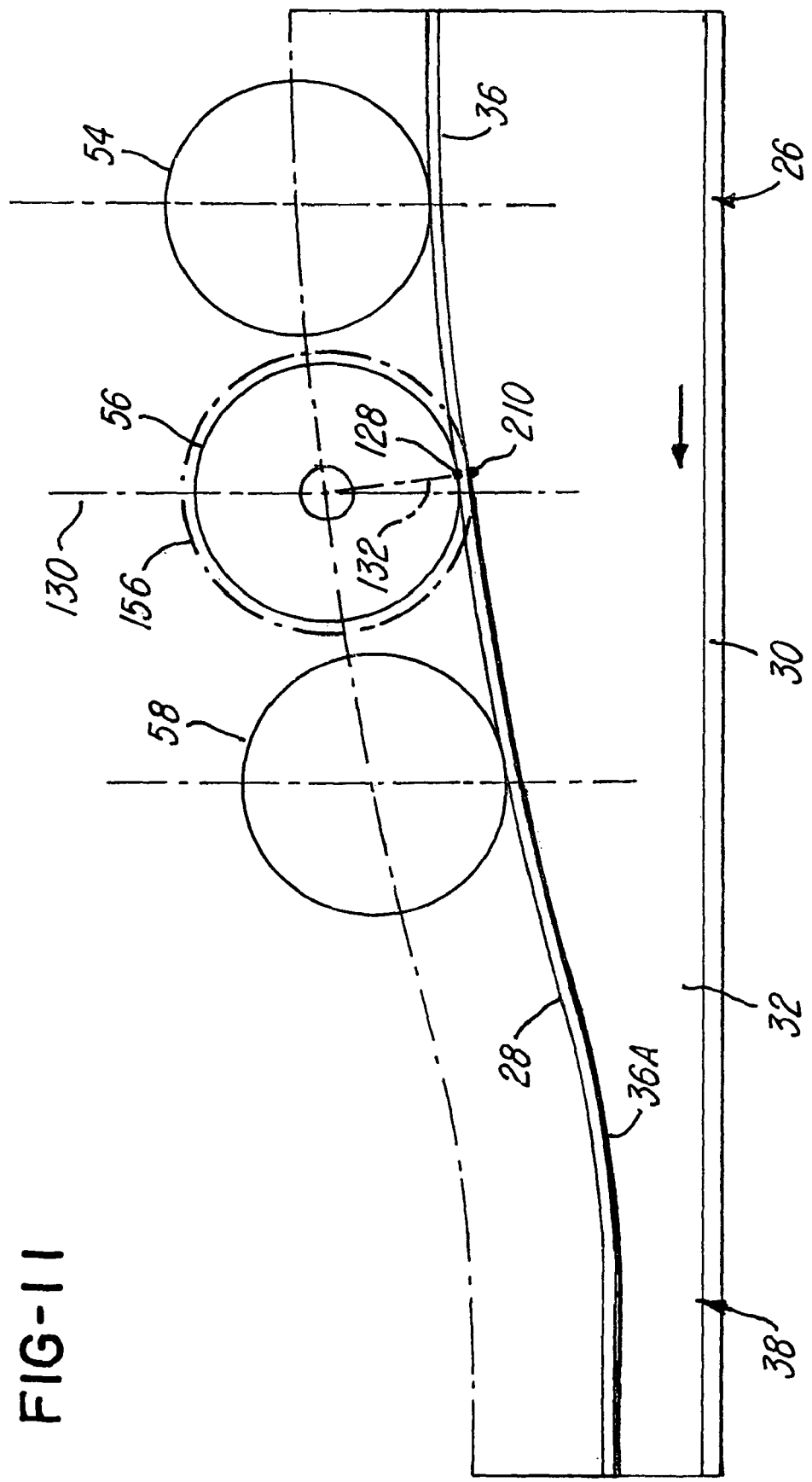
FIG. 11 is a further simplified, diagrammatic view showing yet another section of the workpiece engaged with the rolls and diagrammatically indicating the weld point and the contact point of the pinch roll with the workpiece.

The importance of the seam tracking assembly 234 is illustrated by FIGS. 11-13. FIG. 11 diagrammatically illustrates the three rolls 54, 56 and 58 engaged with a downwardly sloping portion of the metal strip. An imaginary circle 156 extends around the pinch roll 56 that has a radius which is greater than the radius of the pinch roll 56 by a length equal to the thickness of the metal strip 28. The ideal weld point 210 is a point at which the imaginary circle 156 is intersected by a radial line 232 that extends from the center of the pinch roll 56 through the point of contact of the pinch roll 56 with the top surface of the metal strip 28 and through the seam line 36 where it is intersected by the imaginary circle 156. Because of the slope of the portion of the metal strip 28 engaged by pinch roll 56, the point of engagement, designated 128 in FIG. 11, of the pinch roll 56 with the metal strip 28 is not on a vertical line, designated 130 in FIG. 11, passing through the center of the pinch roll 56 but rather on line 132 passing through the center of the pinch roll 56, which line 132 is counterclockwise from the vertical line 130 by a few degrees. Thus, the focal point 210 of the laser welding head 204, would be located on the same line 132 that passes through the center of the pinch roll 56 and the point of engagement 128 of the pinch roll 56 with the metal strip 28.

Whenever the rolls 54, 56 and 58 are on slope which is the same for all of them, such as when the three rolls 54, 56 and 58 are on a horizontal section of the metal strip 28, the center of the pinch roll 56, the engagement point 128 of the pinch roll 56 with the metal strip 28 and the weld point 210 will be on the same radial line. In all other cases, in the practice of this invention, it is not possible to locate the weld point 210 precisely along the line that extends between the center of the pinch roll 56 and the engagement point 128. Rather, as in an example diagrammatically illustrated in FIGS. 11-13, the weld point will not be precisely ideally located but will be located sufficiently close to the seam 36 as to create a satisfactory weld. With the contours sloping as shown in FIGS. 11 and 12 the focal or weld point 210 on the imaginary circle 156 is slightly clockwise from the engagement point 128 of the pinch roll 56 with the metal strip 28. FIG. 13 diagrammatically illustrates the condition existing in FIG. 12, but on a greatly enlarged scale. This shows that the weld point 210 is only a very short distance from directly engaging the imaginary circle 156 on which weld points are ideally located. In practice, as an example, if the pinch roll 56 has a diameter of 55 mm, and the metal strip 28 has a thickness of 2.5 mm, the condition illustrated in FIGS. 11-13, the actual weld point 210 would be spaced from the imaginary circle 156 by only approximately 0.050 mm as illustrated in FIGS. 12 and 13. Other weld points offset from ideal will occur at as parts of the workpieces having different contours pass through the welding machine. Other workpieces (not shown) having various different contours will typically also have locations at which the weld points may be satisfactory but less than ideal. Of course, there may be circumstances in which the contours of workpieces to be welded are such that welding by the method and machine of this invention may not be usable.

The pressure exerted on the pinch roll 56 may be advantageously regulated to be uniform throughout a welding operation as may the pressures exerted on the second upstream hold-down roll 54 and the first downstream hold-down roll 58. The combined downstream pressures exerted on the latter hold-down rolls 54 and 58 should be less than the pressure exerted on the pinch roll 56 so that the pinch roll 56 will maintain the profile base member 26 and the metal strip 28 pinched against one another. Otherwise, the hold down rolls 54 and 58 may tend to lift the pinch roll 56.

It will be understood that, within the purview of the invention, various changes may be made within the scope of the following claims.

What is claimed is:

1. Apparatus for welding together two elongate workpieces moving along a track, said workpieces joined along a seam line which varies in vertical height above said track, said apparatus comprising a laser welding head mounted for both vertical and rotary movements relative to said track, and means for moving said laser welding head vertically and rotationally in response to changes in the height and slope of said portions of said seam line, and further comprising a pinch roller mounted for rotation about a horizontal axis which applies pressure to said workpieces and which moves vertically in response to changes in height or slope of said seam line, said laser welding head mounted for rotation about said horizontal axis.

2. Apparatus for welding together two elongate workpieces comprising a first, lower workpiece having a planar bottom surface and a non-planar top surface that is higher above said bottom surface at at least one location along the length of said first workpiece than at at least one other location along the length of said first workpiece, and a second, upper workpiece having a lower surface engageable with said top surface of said first workpiece along a nonlinear weld line extending along a seam line formed between said first workpiece and said second workpiece along a margin of said top surface of said first workpiece and said lower surface of said second workpiece and extending continuously along the length of at least one of said workpieces, said apparatus comprising: a track including rolls for supporting said lower one of said workpieces and moving said workpiece along a path extending through said welding machine; a guide assembly for engaging said second workpiece on said top surface of said first workpiece; three pressure-applying rolls comprising a central pinch roll mounted for rotation about a first, horizontal pinch roll axis, a first hold-down roll upstream of said pinch roll and rotatable about a second horizontal axis parallel to said pinch roll axis, and a second hold-down roll downstream of said pinch roll and rotatable about a third axis parallel to said pinch roll axis; means constantly biasing each of said three pressure-applying rolls into engagement with the top surface of said second workpiece as it passes beneath said pressure-applying rolls so that a seam is maintained between said first and second workpieces along a line of joinder between them; a laser welding beam aimed toward said seam as it passes adjacent said pinch roll at a weld point positioned on said seam on a line passing through the center of said pinch roll and perpendicular to an imaginary line passing through the axes of rotation of said first hold-down roll and said second hold-down roll.

3. A method for welding together two elongate workpieces comprising a first, lower workpiece having a planar bottom surface and a non-planar top surface that is higher above said bottom surface at at least one location along the length of said first workpiece than at at least one other location along the length of said first workpiece, and a second, upper workpiece having a lower surface engageable with said top surface of said first workpiece along a nonlinear weld line extending along a seam line formed between said first workpiece and said second workpiece along a margin of said top surface of said first workpiece and said lower surface of said second workpiece and extending continuously along the length of at least one of said workpieces, said method comprising the steps of: providing a track including rolls for supporting said lower one of said workpieces and moving said workpiece along a path extending through said welding machine; mounting said first workpiece on said track; engaging said second workpiece on said top surface of said first workpiece; passing said first workpiece and said second workpiece along said track under a sequence of three pressure-applying rolls comprising a central pinch roll, a first hold-down roll upstream of said pinch roll, and a second hold-down roll down stream of said pinch roll; constantly biasing each of said three pressure-applying rolls into engagement with the top surface of said second workpiece as it passes beneath said pressure-applying rolls so that a seam is maintained between said first and second workpieces along a line of joinder between them; pointing a laser welding beam to a part of said seam passing beneath said pinch roll at a weld point positioned on said seam on a line passing through the center of said pinch roll and perpendicular to an imaginary line passing through the axes of rotation of said first hold-down roll and said second hold-down roll.

\* \* \* \* \*